S. A. STRICKLAND.

PUMP FOR MOTOR VEHICLES.

APPLICATION FILED DEC. 31, 1915.

Reissued Mar. 25, 1919.

14,621.

2 SHEETS—SHEET 1.

Inventor

Silas A. Strickland

Witnesses

Karl H. Butler

Chas. W. Stauffer

By Barthel & Barthel

Attorneys

S. A. STRICKLAND.

PUMP FOR MOTOR VEHICLES.

APPLICATION FILED DEC. 31, 1915.

Reissued Mar. 25, 1919.

14,621.

2 SHEETS—SHEET 2.

Inventor

Silas A. Strickland

Witnesses

Karl H. Butler

Chas. W. Stauffer

By Barthel & Barthel

Attorneys

UNITED STATES PATENT OFFICE.

SILAS A. STRICKLAND, OF DETROIT, MICHIGAN, ASSIGNOR TO DETROIT ACCESSORIES CORPORATION, OF DETROIT, MICHIGAN, A CORPORATION OF MICHIGAN.

PUMP FOR MOTOR-VEHICLES.

14,621. Specification of Reissued Letters Patent. Reissued Mar. 25, 1919.

Original No. 1,150,977, dated August 24, 1915, Serial No. 855,348, filed August 6, 1914. Application for reissue filed December 31, 1915. Serial No. 69,696.

*To all whom it may concern:*

Be it known that I, SILAS A. STRICKLAND, a citizen of the United States of America, residing at Detroit, in the county of Wayne and State of Michigan, have invented certain new and useful Improvements in Pumps for Motor-Vehicles, of which the following is a specification, reference being had therein to the accompanying drawings.

It is common practice in motor vehicle construction to embody therein an air pump to be driven by the vehicle motor for inflating tires and other purposes, the pump being a permanent part of the structure, but in such constructions provision must be made for the pump when a car is built, thus increasing the cost, and space which might be utilized for other purposes is taken up. An air pump which may be carried in the tool box and quickly attached to the motor to be positively driven thereby and which may be readily applied to any of the several motor car constructions so that it may be sold as an accessory, is very desirable.

Modern motor vehicles which are equipped with engine starters are usually provided with a forwardly extended crank shaft to which a starting crank may be applied and it is the object of this invention to provide means whereby a suitable pump may be detachably supported with its crank shaft in axial alinement with the projecting end of the motor shaft; and to provide a suitable connection for detachably engaging the crank shaft of the motor to drive the pump directly from the engine without the necessity for intermediate gears or other speed reducing means, said support and connection being so constructed and arranged as to adapt the same for connecting the pump with any one of the several types of construction used by motor car builders.

A further object of the invention is to provide means whereby the clutch member commonly employed to connect the starting crank with the engine shaft may be utilized to connect the air pump with said shaft; and to provide certain other new and useful features in the construction and arrangement of parts.

To these ends the invention consists in the matters hereinafter set forth and more particularly pointed out in the appended claims, reference being had to the accompanying drawings in which—

Figure 1:
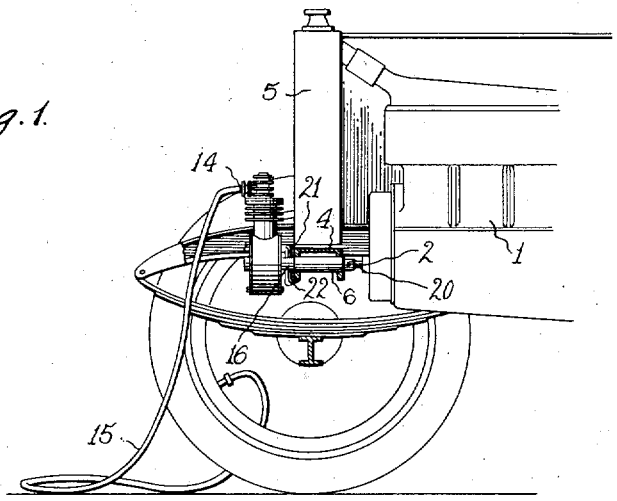
Figure 1 is a sectional view of the forward end of a motor car showing an air pump construction embodying the invention in place thereon.
Figure 2:
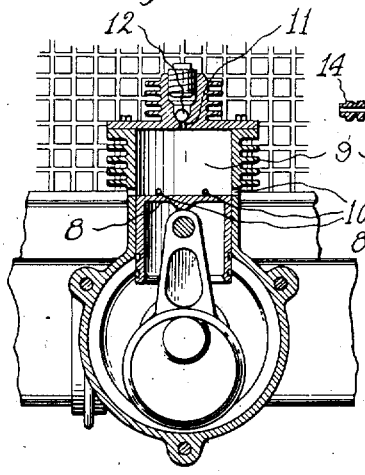
Fig. 2 is an enlarged detail of the air pump showing the same in transverse vertical section.
Figure 3:
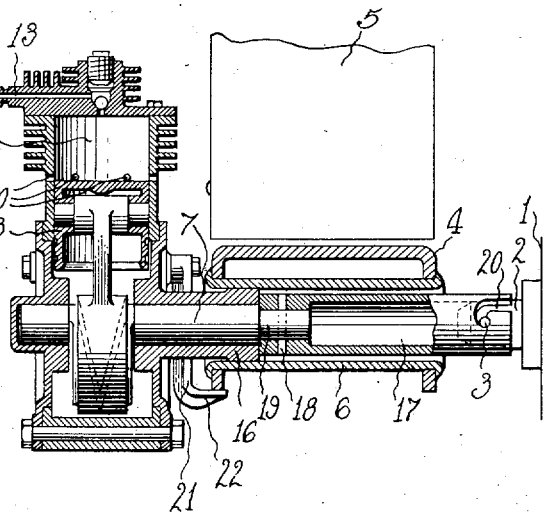
Fig. 3 is a similar detail showing the air pump and connecting means therefor in longitudinal vertical section.
Figure 4:
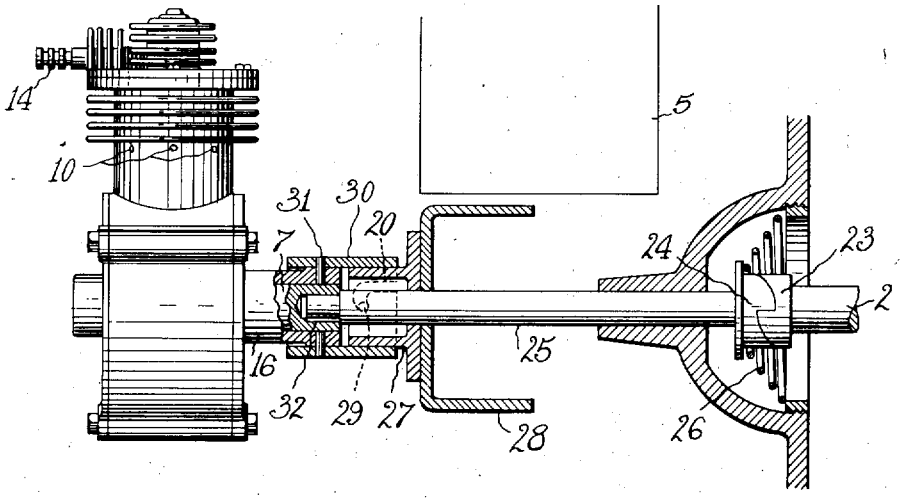
Fig. 4 is a detail similar to Fig. 3 showing the air pump in side elevation and illustrating a modification of the invention to adapt it for use upon a different motor car construction.
Figure 5:
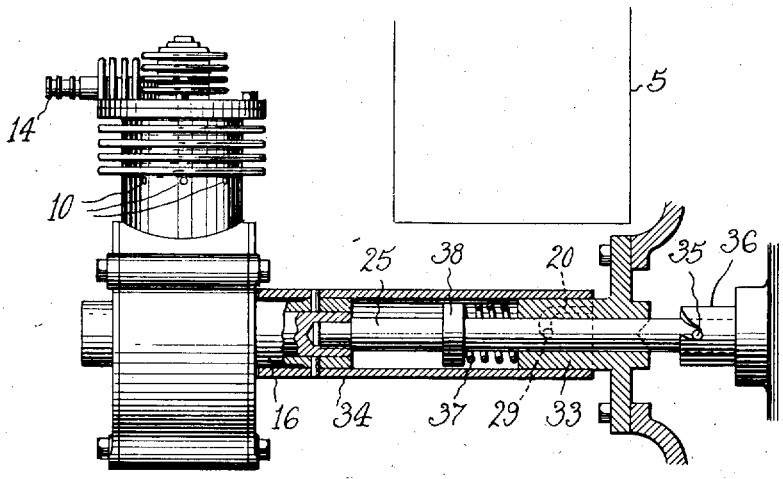
Fig. 5 is a similar detail showing a further modified construction.

In Figs. 1 to 3 inclusive a motor car construction is shown in which the crank shaft of an internal combustion engine 1 has a forwardly projecting end 2 provided with a pin 3 for the engagement therewith of a suitable crank (not shown) for turning the crank shaft to start the engine. A channel iron frame member 4 extends across the forward end of the vehicle frame beneath a radiator 5 and is provided with a tubular member 6 directly opposite the projecting end 2 of the crank shaft, adapted to form a guide bearing for the starting crank when the same is engaged with the crank shaft to start the motor. This construction is illustrative of one of a number of motor car constructions commonly used where an automatic starter is provided for cranking the internal combustion engine. Other constructions in common use are illustrated in Figs. 4 and 5 but I do not wish to limit myself to any particular form or construction of motor vehicle.

While I have illustrated a particular form of air pump which I believe to be suitable for the purpose, I do not limit myself to any particular construction of pump as any suitable pump having a crank shaft 7 for actuating its pumping device or devices, such as a piston 8, may be employed. In the construction of air pump shown, the piston 8 is reciprocable within a vertical cylinder 9 having ports 10 for the admission of air thereto and an exhaust port 11 controlled by a check valve 12 leading to a passage 13 through a nipple 14 to which a suitable air hose 15 may be secured for conducting the air to the valve of a pneumatic tire or other receiving chamber or device.

The crank case of the pump is preferably provided with an extended hub 16 which forms a bearing for the shaft 7 extending therethrough and also forms a support for the pump when said hub is inserted within the forward end of the tubular bearing 6, as illustrated in Fig. 3. In order to connect the rear end of the pump crank shaft 7 with the forward end 2 of the engine shaft in the particular type of vehicle construction shown in Figs. 1 and 3, a tubular connecting member 17 is secured in any suitable manner, as by a pin 18, with the reduced rear end 19 of the shaft 7. The rear end of this tubular member or sleeve 17 is formed with an inwardly extending longitudinal slot 20 having a laterally extended curved inner forward end and this slot is adapted to receive the pin 3 to detachably connect the pump with the motor.

The curved inner end of the slot 20 is so arranged that when the motor is started, the pin will move into the lateral end of the slot, and thus lock the sleeve in engagement therewith, and to prevent the pump casing and its cylinder 9 from rotating when the engine is started, suitable means, such as a bracket 21 having a lug 22 to engage beneath the cross member 4, is provided upon the crank case of the pump, said bracket being preferably made detachable so that when the pump is used upon other vehicles having a different construction, this bracket may be dispensed with.

In the vehicle construction shown in Fig. 4, the forward end 2 of the motor crank shaft is shown as provided with a clutch member 23 having suitable teeth or projections to engage like projections upon a clutch member 24 carried by an extension 25 of the crank shaft. The clutch jaws are normally held out of engagement by means of a spring 26 and the forward end of the extension shaft 25 projects through a tubular bearing 27 upon a frame member 28 extending across beneath the radiator 5. The tubular bearing member 27 is provided with an outwardly extending pin 29 shown in dotted lines, and the air pump is supported by this bearing member 27 when in operative position, by a sleeve 30 which is secured in any suitable manner as by pins 31 to the rear end of the hub 16 on the pump casing. The sleeve 30 is formed with a longitudinal slot similar to the slot 20 to engage the pin 29. The forward end of the extension shaft 25 is preferably reduced in diameter to engage a socket provided therefor in the end of the crank shaft 7 of the pump and a key 32 or other suitable means is provided to cause said extension shaft and pump shaft to turn together.

In order to hold the clutch jaws 23 and 24 in engagement, so that they will transmit motion and turn the extension shaft 25 to drive the pump, the sleeve 30 is formed to engage the pin 29 and this engagement is accomplished by pushing the sleeve endwise upon the bearing member 27 against the action of the spring 26 which tends to hold the shaft extension 25 projected, and when the pin 29 has entered the slot the pump casing and sleeve are turned to bring the pin into the laterally extended end of the slot and thus lock the sleeve in place with the clutch members engaged.

In Fig. 5 a vehicle construction similar to that shown in Fig. 4 is illustrated but in this instance the frame members 4 and 28 are dispensed with and the extension shaft 25 is supported in an elongated bearing 33 on the casing of the engine. The pump is supported as in Fig. 4 by an elongated sleeve 34 secured at its forward end to the hub 16 of the pump and provided at its rear end with the slot 20 to engage a pin 29 on the extended bearing 33 which is turned down to slip into the end of the sleeve. The extension shaft 25 has one or more pins 35 on its rear end to engage corresponding notches in the tubular extended end 36 of the engine crank shaft, and the extension shaft is normally held with the pin out of engagement with the notch, by means of a spring 37 sleeved thereon between a collar 38 on the shaft and the outer end of the bearing 33. The pump casing is thus firmly supported and locked in position by the sleeve 34 which also serves to hold the clutch members comprising the pins 35 and their slots, in engagement.

Obviously, changes may be made to adapt the device to be applied to other motor vehicle constructions and I do not therefore limit myself to the particular constructions or arrangements shown.

Having thus fully described my invention what I claim is:—

1. The combination of an extension member for the shaft of a motor, a connecting member on the end of said extension member adapted to be engaged with a member on a motor shaft by an endwise movement of the extension member, a pump, and means for supporting the pump in engagement with the extension member to be driven thereby and for holding said member moved endwise to hold the connecting members engaged.

2. The combination of a pump having a casing and a shaft projecting therethrough, means for detachably connecting the pump shaft with the shaft of the motor of a motor vehicle, and a supporting member on the pump casing to detachably engage a bearing adjacent the end of the motor shaft to support the pump independently of the connecting means and with the pump shaft in axial alinement with the motor shaft, said member forming the sole support for the pump.

3. The combination of an extension member for the forwardly extending end of a motor crank shaft, a connecting member on the end of the extension member to engage a connecting member on the shaft, a spring to normally hold said extension member moved endwise with said connecting members disengaged, a pump having a crank shaft adapted to be detachably connected to the outer end of the extension member, and means for holding the pump and the extension member moved endwise against the action of said spring with the connecting members engaged.

4. The combination of a pump having a crank shaft, a tubular member on the pump with the pump crank shaft extending into one end thereof, and formed to engage a bearing to rigidly support the pump with its crank shaft in axial alinement with an engine shaft, and connecting and disconnecting means for transmitting motion from an engine shaft to the pump shaft.

5. The combination of a pump having a crank shaft, a tubular supporting member into one end of which the pump crank shaft extends, connecting and disconnecting means within the tubular member for connecting an engine shaft and the pump shaft, and means coöperating with the tubular member for holding the connecting and disconnecting means engaged.

6. The combination of a pump having a crank shaft, an extension for an engine shaft, connecting and disconnecting means for connecting the engine shaft and extension, a bearing for the extension, a supporting member for the pump detachably engaging said bearing, and means for detachably holding the supporting member engaged with the bearing.

7. The combination of a pump having a casing provided with an extended hub forming a bearing for the crank shaft of the pump, a sleeve engaging said hub and adapted to engage a supporting bearing to form a support for the pump casing, and a member within the sleeve projecting therefrom at one end and adapted to connect and disconnect the end of an engine shaft and the end of the pump shaft and detachably engaged with said pump shaft.

8. The combination of a pump having a crank shaft, an extension for an engine shaft, connecting and disconnecting means for the engine shaft and extension, a bearing for the extension, a supporting member for the pump to hold the same with its crank shaft engaged with the extension, and means for detachably holding the supporting member in place.

9. The combination of an extension member for the crank shaft of a motor, means for detachably connecting the extension member and the crank shaft of a motor by an endwise movement of the member, a bearing member for the extension member, a pump having a crank shaft, a tubular member on the pump surrounding its crank shaft and adapted to detachably engage the bearing for the extension member to support the pump with its crank shaft in alinement and engaged with the end of the extension member.

10. The combination of an extension member for a motor crank shaft adapted to be detachably engaged therewith, a bearing for the extension member, a pump having a casing provided with an extended hub and a crank shaft extending through the hub, a tubular supporting member secured upon the hub and into which the extension member extends, said tubular member being adapted to receive the bearing member for the extension member at its opposite end, and interlocking means between the bearing member and the tubular supporting member to hold the pump casing from turning and the extension member engaged with the crank shaft of the pump.

11. In a combination with a pump including a casing and shaft, of a member concentric with the pump shaft forming the sole means for detachably supporting the pump, and means for preventing the bodily rotation of the pump about the axis of the shaft when power is applied to the pump shaft to turn the same.

12. The combination of a pump casing having an extended hub, a shaft extending through the hub, said hub forming the sole support for the pump, and means for preventing the bodily rotation of the pump casing about the axis of the shaft when power is applied to the projecting end of the shaft to turn the same.

13. The combination with a pump, including a casing and shaft, of a tubular member forming the sole means for detachably supporting the pump, through which member motion is adapted to be transmitted from a driving shaft to the pump, and means for preventing the rotation of the casing about the axis of the pump shaft.

In testimony whereof I affix my signature in the presence of two witnesses.

SILAS A. STRICKLAND.

Witnesses:
LEWIS E. FLANDERS,
G. E. MCGRANN.